United States Patent
Eggleton (10) Patent No.: US 6,835,163 B2
(45) Date of Patent: Dec. 28, 2004

(54) AUTOMATED GEAR SELECTION APPARATUS

(75) Inventor: Ross Eggleton, Gaven (AU)

(73) Assignee: Australian Concrete Garden Edging Pty Ltd., Gaven (AU)

( * ) Notice: Subject to any disclaimer, the term of this patent is extended or adjusted under 35 U.S.C. 154(b) by 6 days.

(21) Appl. No.: 10/340,135

(22) Filed: Jan. 10, 2003

(65) Prior Publication Data

US 2003/0126936 A1 Jul. 10, 2003

(30) Foreign Application Priority Data

Jan. 10, 2002 (AU) ................................................ PR9870

(51) Int. Cl.$^7$ ........................... B60K 41/04; F16H 59/00
(52) U.S. Cl. ........................................ 477/115; 74/335
(58) Field of Search ............................ 477/115; 74/335, 74/336 R, 473.12, 473.14, 473.15, 473.18; 701/52, 59, 64

(56) References Cited

U.S. PATENT DOCUMENTS

| | | | |
|---|---|---|---|
| 3,605,520 A | * 9/1971 | Lorenz et al. | ........... 74/473.15 |
| 4,595,986 A | * 6/1986 | Daubenspeck et al. | ....... 701/51 |
| 4,856,360 A | * 8/1989 | Yoshimura et al. | ........... 74/335 |
| 4,922,769 A | * 5/1990 | Tury | ........................... 74/335 |
| 5,219,391 A | * 6/1993 | Edelen et al. | ................. 74/335 |
| 5,743,143 A | * 4/1998 | Carpenter et al. | ............ 74/335 |
| 5,827,149 A | * 10/1998 | Sponable | ..................... 477/92 |
| 5,832,777 A | 11/1998 | Weilant | |
| 6,151,977 A | 11/2000 | Menig et al. | |
| 6,157,886 A | * 12/2000 | Janecke | ...................... 477/115 |
| 6,173,622 B1 | 1/2001 | Carnevale et al. | |
| 6,230,576 B1 | 5/2001 | Yamada et al. | |
| 6,378,393 B1 | * 4/2002 | Bates | ...................... 74/473.18 |

FOREIGN PATENT DOCUMENTS

| | | | |
|---|---|---|---|
| EP | 000046845 A2 | * 3/1982 | ................. 477/115 |
| GB | 2311829 A | 10/1997 | |

OTHER PUBLICATIONS

Patent Abstracts of Japan, JP, 03–2343965 A (DELTA KOGYO KK), Oct. 18, 1991.

* cited by examiner

Primary Examiner—Roger Pang
(74) Attorney, Agent, or Firm—Boyle, Fredrickson, Newholm, Stein & Gratz, S.C.

(57) ABSTRACT

An automated gear selection apparatus for a gearbox having a linear gear selector is provided. The apparatus includes an actuator having a shaft displaceable between at least two predetermined positions corresponding to positions of the gear selector. A control means communicates with the actuator to control displacement of the shaft. The shaft is connectable to the gear selector, by means of a cable, for displacing the selector between gear selection positions. A quick release assembly secures the cable to the shaft and includes a manual operation handle. The apparatus also includes a user interface means operatively connected to the control means so that a user can selectively cause operation of the actuator and thus the gear selector. The apparatus provides a convenient and automated means for gear selection.

24 Claims, 7 Drawing Sheets

AUTOMATED GEAR SELECTION APPARATUS

FIELD OF THE INVENTION

This invention relates to an automated gear selection apparatus.

BACKGROUND TO THE INVENTION

In this specification, the invention will be described with reference to gearboxes having a linear gear shifting mechanism as are commonly found in marine craft for example. Such gearboxes have a gear selector that moves linearly to select between two or more gears, such as a forward gear, a neutral gear and a reverse gear.

Linear gearboxes are typically operated by means of a manually operable lever or "gearstick" that is usually coupled to the gearbox's shifting mechanism by means of a gear selector cable. In use, the lever is pushed forward to engage the forward gear, drawn into an intermediate position to engage the neutral gear and drawn fully backwards to engage a reverse gear. There are a number of disadvantages with such an arrangement.

A first disadvantage is that considerable strength may be required to operate the lever. Consequently, gear changing may be awkward or clumsy, particularly for those who are unfamiliar with controlling marine craft or do not have muscular strength.

A second disadvantage is that accidental shifting of the lever may have disastrous consequences. For example, inadvertently falling on or striking the gearstick will cause the craft to accelerate or decelerate in an uncontrolled and hazardous manner. Alternatively, in a recreational marine craft, a child may pull or push on the lever. Those who have had experience with boating will realize that such an event can be particularly dangerous. At present mechanical lock-out mechanisms are known for preventing the inadvertent operation of the gearstick. However, mechanical lockout mechanisms are typically inconvenient and time-consuming to use.

It is an object of the present invention to provide a convenient and easy to use mechanism for operating a linear gear selector and to address the disadvantages described above.

SUMMARY OF THE INVENTION

According to the present invention there is provided an automated gear selection apparatus for a gearbox of a drive unit, the gearbox having a linear gear selector that is displaceable between at least a first position and a second position, the gear selection apparatus including:

an actuator including an actuator member displaceable between at least two predetermined positions corresponding to the positions of the linear gear selector;

a control means in communication with the actuator to control displacement of the actuator member, the actuator member being connectable to the gear selector for displacing said selector between at least the first and second positions; and a user interface means operatively connected to the control means so that a user can selectively cause operation of the actuator and thus the gear selector.

A cable securing assembly may be attached to the actuator member for engaging a gear selector cable. Preferably the actuator member comprises a shaft that is extendible and retractable relative to a housing of the actuator. Alternatively the member may comprise a rotatable reel about which the gear selection cable may be wound.

The cable securing assembly may be attached to the shaft by means of a quick release member. The cable securing assembly preferably includes a handle for manual gear selection.

In a preferred embodiment the control means is configured to monitor user selection of a desired gear and in response bring the shaft to a position for selection of the desired gear. Furthermore, it is desirable that the control means is further configured to monitor the position of the shaft.

Typically the control means includes a micro-controller which operates according to firmware including:

instructions for monitoring signals from the user interface means;

instructions for bringing the shaft towards a setpoint corresponding to a signal from the user interface means, the setpoint corresponding to selection of a gear by the linear gear selector.

The firmware may further include instructions for monitoring a feedback signal indicating position of the shaft. In a preferred embodiment the feedback signal is generated by circuitry including a potentiometer coupled to the shaft.

In a preferred embodiment the microcontroller further includes instructions for user entry of setpoints comprising actuator states corresponding to a particular gear selections.

The controller may monitor a signal indicating engine revolution rate and wherein the firmware further includes instructions for determining whether or not to bring the shaft towards a setpoint on the basis of predetermined engine revolution rates.

Preferably the firmware further includes instructions for user entry of the predetermined engine revolution rates. The signal indicating engine revolution rate will typically comprise a signal from an engine ignition system of the engine. However, particularly in relation to diesel engines, the signal indicating engine revolution rate may be generated by a magnetic sensor fixed relative to a magnet attached to a rotating member of the engine.

The instructions for bringing the shaft towards a setpoint will preferably include:

instructions for monitoring the position of the shaft;

instructions for comparing the position of the shaft to a current setpoint;

instructions for moving the shaft towards the setpoint at a speed that is dependent on the deviation of the position of the shaft from the setpoint in order to reduce overshoot.

The user interface typically comprises a console including user data input and output means.

Preferably the user interface means includes a micro-controller arranged to communicate with a micro-controller located in the control means.

The interface means may include a switch means or key that is connected to the control means to provide the control means with command signals relating to a gear selected by a user. The switch means may include a console that is readily accessible by a user. The console may incorporate a number of momentary press switches or keys. Each key may correspond with one respective predetermined position of the gear selector. A discernible signal means may be provided in the control means. The discernible signal means may be in the form of a number of LED's (light emitting diodes) that correspond with respective gears. The LED's may be connected to the micro-controller to indicate to a user whether or not a particular gear has been selected.

According to a further aspect of the present invention there is provided an automated gear selection apparatus for a gearbox of a drive unit, the gearbox having a linear gear selector displaceable between at least a first position and a second position, said gear selection apparatus including:

an actuator means for displacing the linear gear selector between the at least a first position a second position;

cable securing means releasably attached to the actuator means for securing a gear selector cable and including a handle for manual operation;

control means in communication with the actuator means for controlling the actuator means; and user interface means in communication with the control means for receiving gear selections from a user.

According to a final aspect of the present invention there is provided an automated gear selection apparatus for a gearbox of a drive unit, the gearbox having a linear gear selector displaceable between at least a first position and a second position, said gear selection apparatus including:

a linear actuator including a movable shaft displaceable between at least two predetermined positions corresponding to at least the first position and the second position of the linear gear selector;

a controller coupled to the actuator to control displacement of the shaft;

a cable securing assembly attached to an end of the shaft by means of a quick release member;

a user interface connected to the controller for user selection of a position of the linear gear selector.

The invention is now described, by way of example, with reference to the accompanying drawings. The following description is for the purpose of illustrating an embodiment of the invention to a person of ordinary skill in the field. As such, the specific nature of the following description is not to be construed as limiting the scope of the invention described in the appended claims.

DETAILED DESCRIPTION OF PREFERRED EMBODIMENTS

Figure 1:
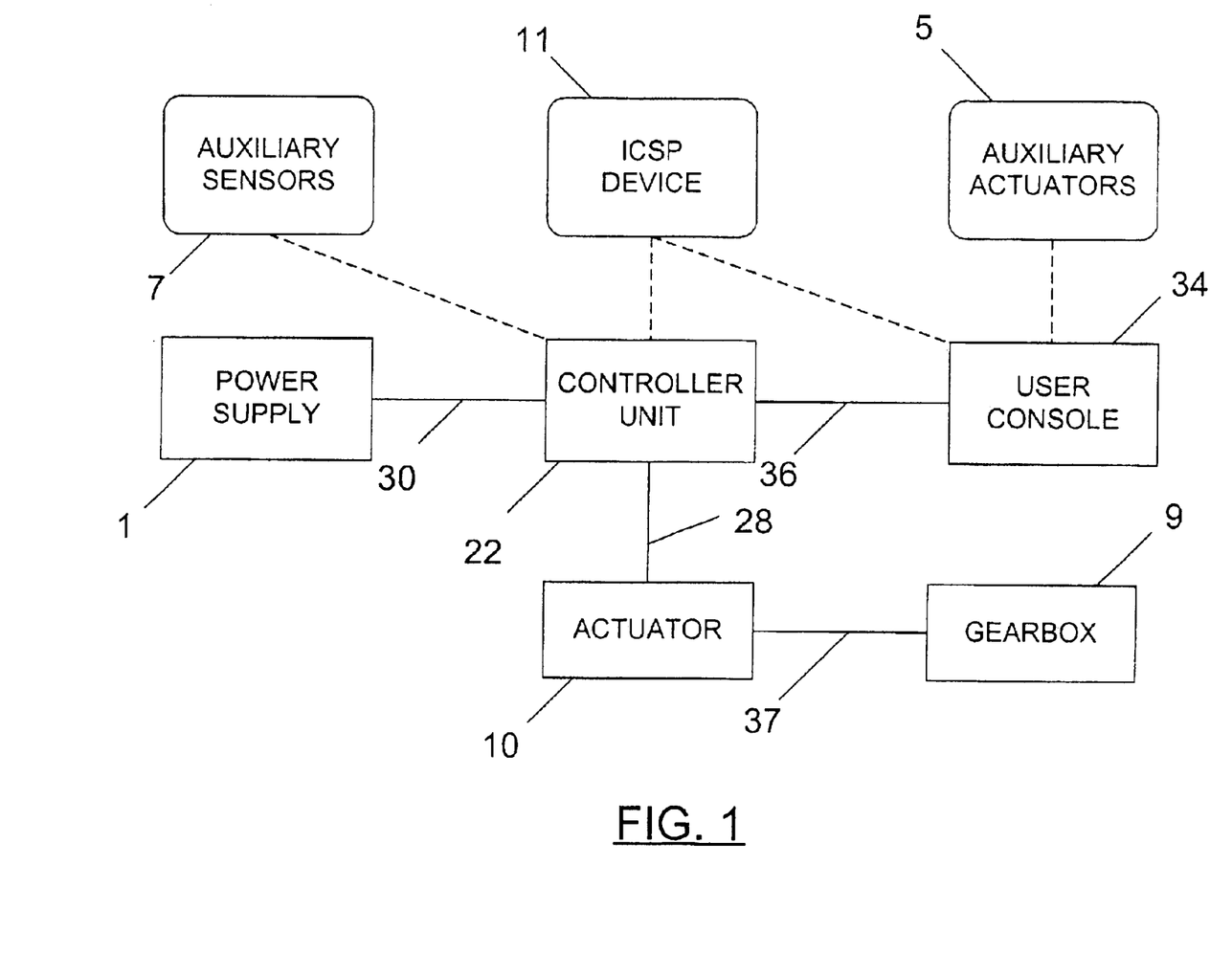
FIG. 1 is a block diagram of an automated gear selection apparatus according to a preferred embodiment of the invention.

FIG. 1 is a block diagram of an automated gear selection apparatus (AGSA) according to a preferred embodiment of the present invention. The AGSA includes a console 34 which is bi-directionally connected by means of electrical cable 36 to a control unit 22. Control unit 22 is bi-directionally connected, by electrical cable 28, to an actuator 10 that is mechanically coupled to a linear gearbox 9 by a gear selector cable 37. Where the AGSA is installed in a marine craft, power supply 1 comprises a 12-Volt battery and power supply of the craft. The power supply is coupled to control unit 22 by electrical cable 30. Control unit 22 distributes power by means of electrical cables 36 and 28 to console 34 and actuator 10 respectively. A number of optional modules may also be included and connections to these are shown with dashed lines in FIG. 1. For example, expansion modules in the form of auxiliary actuators 5 and sensors 7 may be connected to control unit 22 and console 34. Similarly expansion modules in the form of auxiliary sensors 7 may be connected to control unit 22. The auxiliary actuators and sensors may be concerned with the operation and monitoring of the marine craft's throttle for example. Micro-controller chips are located in console 34 and control unit 22 and may be conveniently programmed by means of an external In-Circuit Serial Programming Device (ICSPD) 11.

Figure 2:
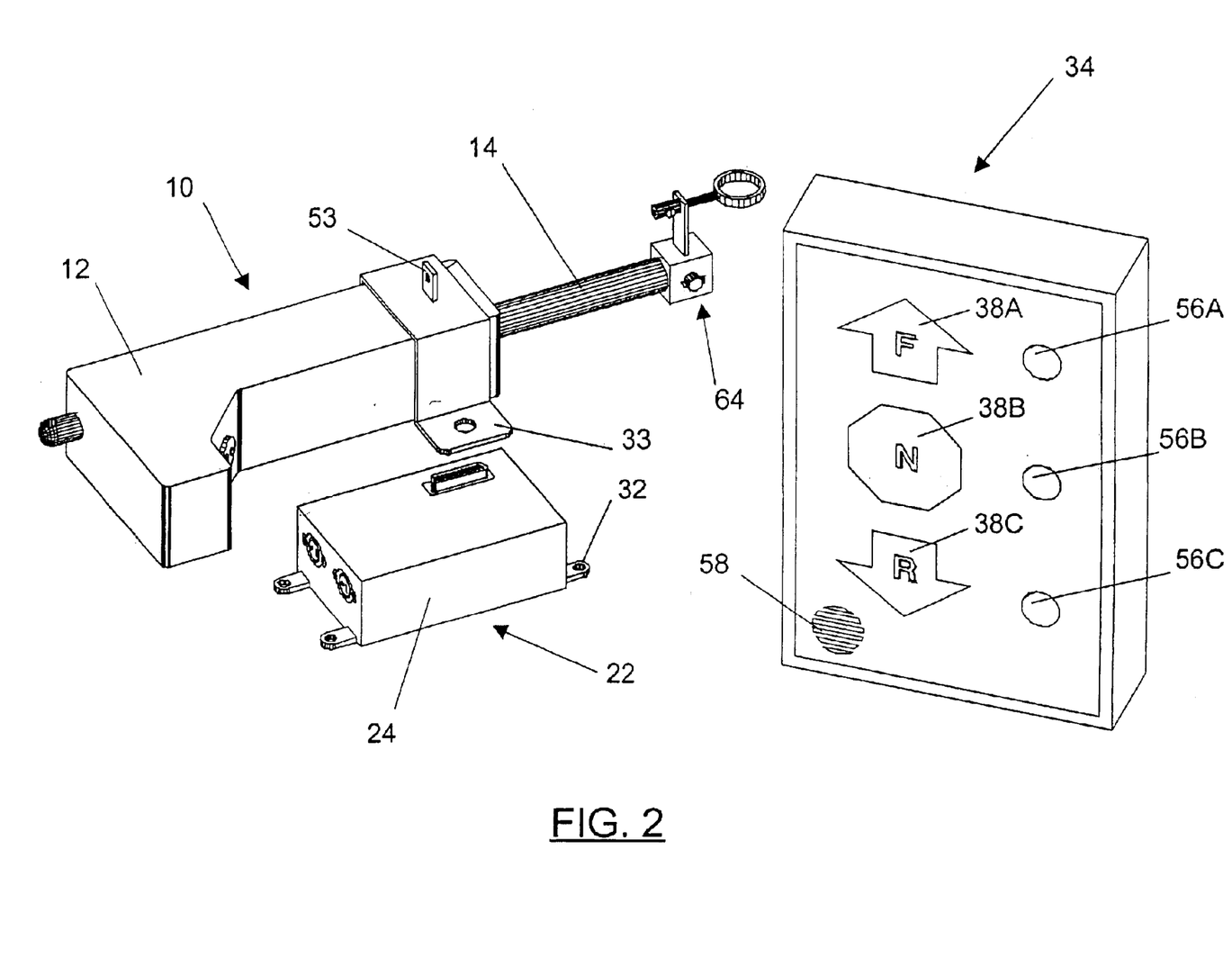
FIG. 2 is a perspective view of a linear actuator, control unit and user console according to a preferred embodiment of the invention.

Referring now to FIG. 2, there is depicted a perspective view of console 34, control unit 22 and linear actuator 10 prior to their installation. Console 34 has a panel bearing three gear selection keys in the form of momentary membrane press keys 38A–38C. These comprise a forward key 38A, a neutral key 38B and a reverse key 38C. Adjacent each key 38A–38C is a light emitting diode (LED) 56A–56C respectively. Console 34 further includes a buzzer 58.

Control unit 22 is encased by a watertight housing 24 which includes lugs 32 for mounting to a suitable surface of a marine craft.

Linear actuator 10 includes a housing 12 from which protrudes a displaceable shaft 14. The shaft has a 6-inch (152 mm) stroke. An assembly 63, for securing the free end of gear selection cable 37 is located at the free end of shaft 14. The assembly 63 includes a handle 65 for permitting manual gear selection.

Figure 3:
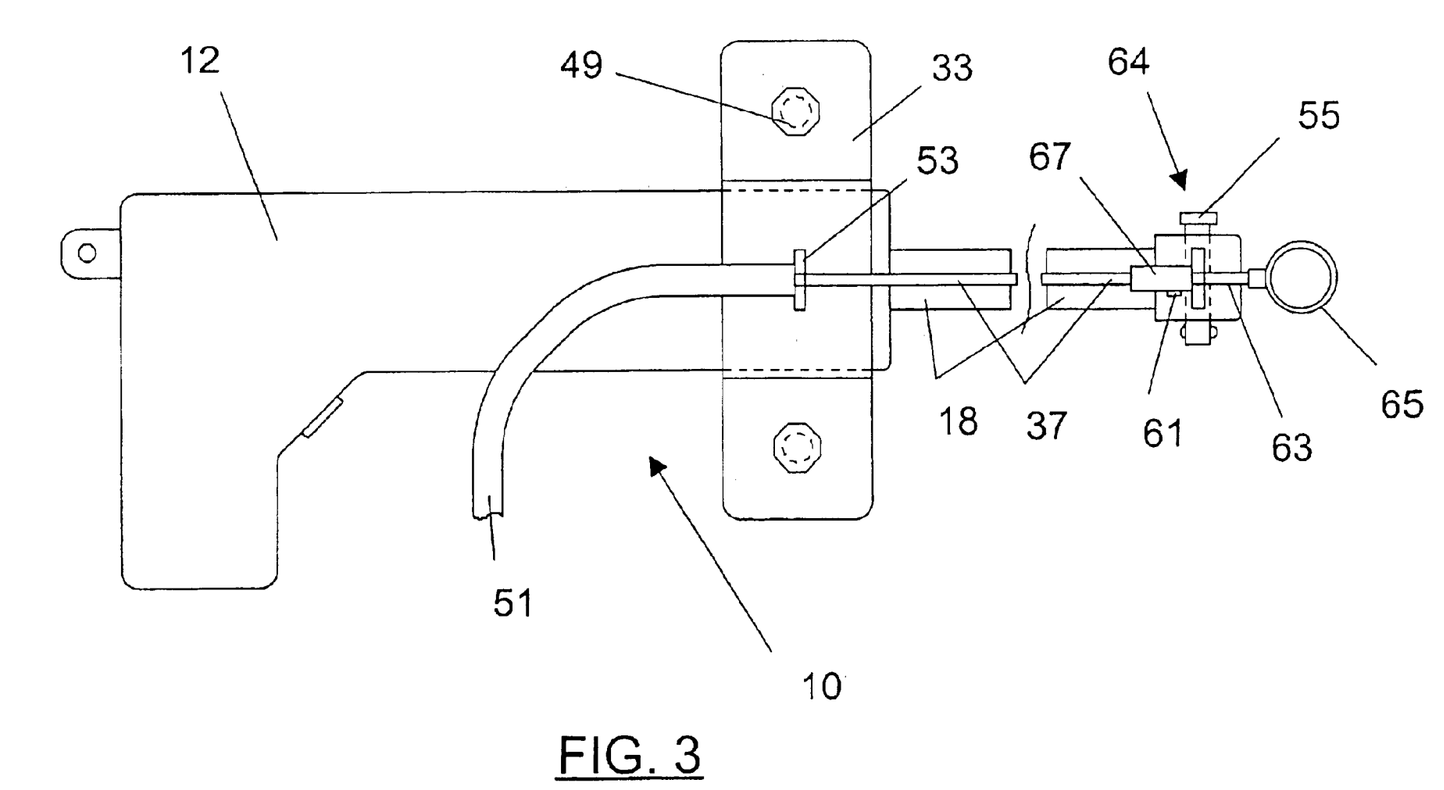
FIG. 3 is a side view of the linear actuator of the automated gear selection apparatus when connected to a gear selector cable.

FIG. 3 is a plan view, of linear actuator 10 with cable 37 attached. Housing 12 of actuator 10 is secured to the marine craft by means of bracket 33 and bolts 49. A flange 53 extends from bracket 33. Flange 53 has a bore through which cable 37 is received. Cable 37 is covered by a sheath 51 that is of too large a diameter to pass through the bore in flange 53. Cable 37 is secured to shaft 14 via adjustment assembly 64. Assembly 64 includes a cable receiving sleeve 67 in which cable 37 is secured by tightening retaining screw 61. The adjustment assembly is releasably coupled to the free end of shaft 14 by means of a quick release means in the form of quick release member comprising ball-lock pin 55 that passes through an aperture at the end of shaft 14.

Linear actuator 10 is a commercially available model being a Warner Linear Electrak® E050. Internally, linear actuator 10 includes a reversible 12V electric motor. The motor is connected to shaft 14 via a suitable gear assembly. Linear actuator 10 further includes a potentiometer that is mechanically coupled to shaft 14. Control unit 24 is able to determine the position of the shaft by monitoring the voltage of the centre tap of the potentiometer.

In normal use an operator of the AGSA depresses one of the keys 38A–38C on console 34. In response, internal circuitry in console 34, which will be described shortly, generates various signals that are conveyed to control unit 22 by means of cable 36. The console circuitry may also light one or more of indicators 56A–56C and/or activate buzzer 58 to provide feedback to the operator. Control unit 22 processes the signals from console 34 by means of internal circuitry that will be described shortly. The internal circuitry in control unit 22 generates driver currents that precisely drive the motor in linear actuator 10 in order that shaft 14 is extended or retracted. Consequently gear selector cable 37 is brought to a position corresponding to the key that was depressed. For example if key 38A, being the "forward" key, is depressed then ultimately shaft 14 is brought to a position that causes a gear train to which it is coupled by gear selector cable 37 to select a forward gear. Alternatively, if key 38B or 38C is depressed then shaft 14 will be brought to a position that will cause a neutral or reverse gear position respectively to be selected. The AGSA may also be operated in a calibration mode wherein suitable shaft positions, to correspond to depression of each of the forward, neutral and reverse keys, 38A–38C may be entered.

Console Unit Circuit Description

Figure 4:
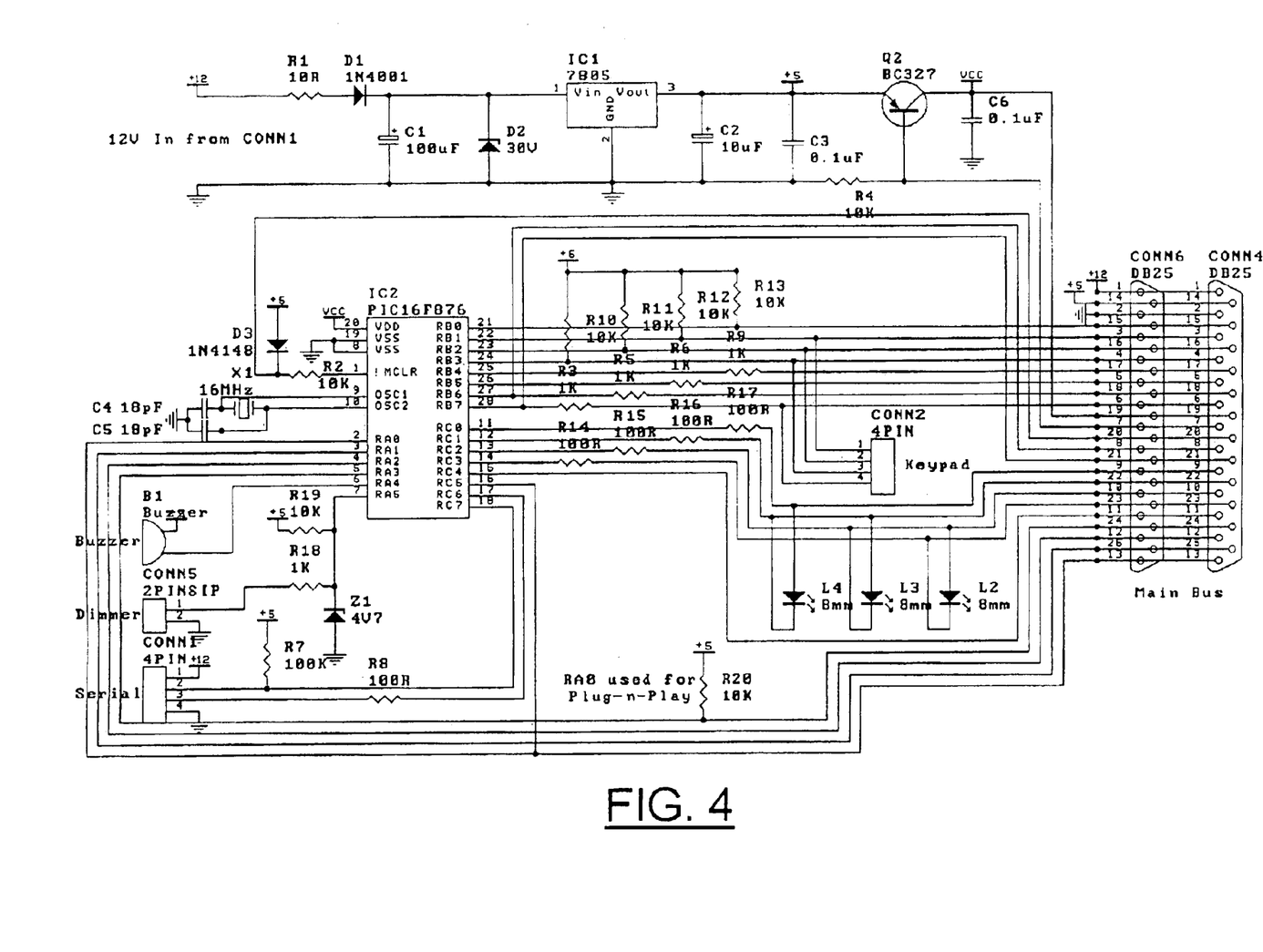
FIG. 4 is schematic diagram of circuitry located within the console of the automated gear selection apparatus of FIG. 1.

Referring now to FIG. 4, there is provided a schematic diagram of circuitry that is located inside console 34.

Power Supply—Power is applied via CONN1, which is remotely fused via the controller device (CONN9). A low-pass filter (realized using R1 and C1) is used to reduce the effects of high frequency noise (3 dB point at 165 Hz) on the 12V supply. Diode D1 also acts to protect the device from reverse polarity connections and negative electrical spikes. Zener diode D2 is used to protect the 5V regulator IC1 from overvoltages of greater than 30V. Voltage regulator IC1 converts the conditioned 12V supply to 5V. The 5V supply produced on the output (pin 3) of IC1 is stabilised via C2 and noise is further reduced via C3. R4 biases pass transistor Q2 on under normal operating conditions. The output of IC1 is a stabilized 5V supply that powers the micro-controller (IC2), support circuitry and peripheral devices.

Micro-controller and Support Circuitry—IC2 is a general-purpose micro-controller PIC16F876 from Microchip Corporation, that operates according to inboard firmware in order to process operator commands entered via keys 38A–38C. IC2 also operates LEDS 56A–56C, and exchanges data signals with control unit 22. IC2 receives its power supply (5V) into pin 20 and is ground referenced via pins 19 and 8. Pin 1 of IC2 is the !MCLR input, used to enable IC2 or reset it under certain circumstances. It is also used as a programming voltage input when used in In-Circuit Serial Programming (ICSP) mode. Accordingly IC2 may be programmed in-circuit by connecting an external ICSP device. Crystal X1 sets IC2's internal oscillator frequency to 16 MHz. Capacitors C4 and C5 stabilize X1. R2 is used to help limit the likelihood of input spikes causing IC2 latch-up. D3 enables IC2 by applying over 2.5V to the !MCLR input. D3 also prevents the ICSP device from placing a high voltage level onto the rest of the 5V supply during programming.

Connectors and Misc. Devices—CONN1 is the main connection to control unit 22. Power for console 34 is received via CONN1. Pins 2 and 3 of CONN1 are serial communication lines used for transmitting and receiving data. CONN5 is a general-purpose input assigned initially as a dimmer input (to dim the indicator LEDs at low ambient lighting conditions). However, CONN5 may be used to interface with external modules, such as the auxiliary actuators 5 and auxiliary sensors 7 of FIG. 1, for any purpose that the firmware onboard IC2 is programmed to support. R18 and Z1 ensure that IC2 is protected from noise and incorrect connections on CONN5. B1 is the piezoelectric buzzer 58 visible on the panel of console 34 in FIG. 1. The buzzer is used to alert users of the console device to errors and other status information.

Keypad Matrix—R3, R5, R6, R9, R10, R11, R12 and R13 are configured to allow the eight I/O pins 21–28 of micro-controller IC2 to be used as a keypad matrix reader. The keypad matrix is set up as a 4×4 grid which may provide for up to 16 individual keys. Connection is made to console 34's three membrane keys 38A–38C via pins 1, 2 and 3 of CONN2. Pin 4 of CONN2 is the ground reference for all three membrane keys.

External Module Adapter—CONN4 and CONN6 are 25-way DB connectors that may be used to interface to external expansion modules such as the auxiliary sensors and actuators shown in FIG. 1. Such modules may comprise, for example, a throttle controller, thruster controller, or other modules as desired. Also, either CONN4 or CONN6 may be used to connect to the In-Circuit Serial Programming (ICSP) device for loading firmware onto IC2.

External Module Detection Input—Pin 5 of IC2 is configured as an analog input, which is read on power-up to determine which modules are connected to console 34 and which firmware needs to be run in order to control them. R20 sets a baseline for external Plug-n-Play connections to be made by providing a 10K pull-up resistor to 5V. Micro-controller IC2 then interprets 5V on pin 5 to signify that no external modules are connected, and in response runs firmware related to the AGSA. If additional expansion modules are connected then they must each have a different valued pull-down resistor, which divides the voltage down as seen on pin 5 of IC2 in a unique pattern, such that controller IC2 is able to unambiguously determine which external modules it is connected to.

In-Circuit Serial Programming (ICSP) Power Supply Isolation—Transistor Q2 acts as a blocking device to voltages appearing at Vcc, so that only micro-controller IC2 receives power from the ICSP device. C6 stabilises the 5V supply from the ICSP device for stable operation while programming. During programming, no power is connected to the rest of the circuit—only IC2 is operational. Pins 7 and 19 provide a power supply of 5V to IC2 during programming. Pins 8, 20 and 21 of CONN6 and CONN4 are used to make a data connection between an externally connected ICSP device and IC2.

LED Indicator Matrix—Pins 11, 12, 13 and 14 of IC2 are set up to drive up to twelve LED indicators, although in the preferred embodiment only three LEDs 56A–56C are fitted. The LEDs are pulsed with a high current in turn as required in very quick procession, giving the appearance that all required LEDs are on simultaneously, whereas only one LED is really on at any point in time. Three LEDs, L2, L3 and L4 are included in console 34 being visible in FIG. 1 as items 38A–38C.

Control Unit Circuit Description

Figure 5:
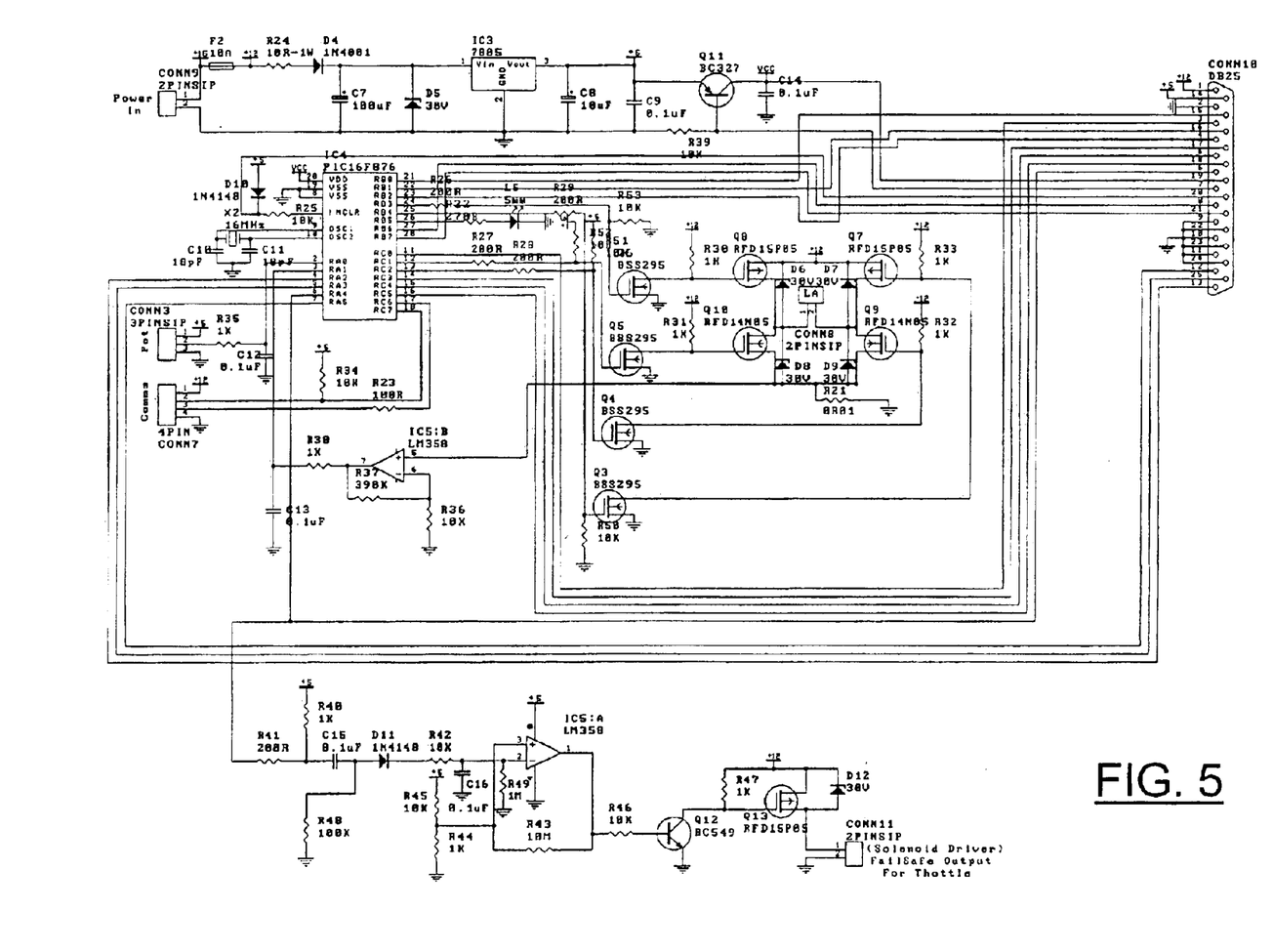
FIG. 5 is a schematic diagram of circuitry located within a control unit of the automated gear selection apparatus of FIG. 1.

Referring now to FIG. 5, there is provided a schematic diagram of the circuitry within control unit 22.

Power Supply—Power is applied via CONN9, which is fused via F2. A low-pass filter (realized using R2 and C7) is used to reduce effects of relatively high frequency noise (3 dB point at 165 Hz) on the 12V supply. Diode D4 protects the device from reverse polarity connections and negative electrical spikes. Zener diode D5 protects the 5V regulator IC3 from receiving a voltage higher than it is specified to take (30V). This can occur with high-powered and/or low frequency (frequencies significantly less than input low pass filter 3 dB point) 'spikes' on the 12V supply. Regulator IC3 converts the conditioned 12V supply to 5V which is then stabilised via C8 and filtered via C9. R39 is used to keep Q11 pass transistor on. The stabilized 5V supply powers micro-controller (IC4), support circuitry and peripheral devices.

Micro-controller and Support Circuitry—Micro-controller IC4 is a PIC16F876 from Microchip Corporation operates according to onboard firmware in order to process user commands received from console 34. IC2 receives its supply (5V) into pin 20 and ground referenced via pins 19 and 8. Pin 1 of IC4 is the !MCLR input, used to enable the device or reset it under certain circumstances. It is also used as a programming voltage input when used in In-Circuit Serial Programming (ICSP) mode. Accordingly, IC4 can be programmed in-circuit by means of an external ICSP device. Crystal X2 sets IC4's internal oscillator frequency to 16 MHz and is stabilized by capacitors C10 and C11. R25 is used to help reduce IC4 latching-up. D10 enables IC4 by applying over 2.5V to the !MCLR input. D10 also protects the ICSP device from placing a high voltage level onto the rest of the 5V supply during programming.

Connectors and Misc. Devices—CONN7 is the main connection to the console device, being connected directly to CONN1 of FIG. 4. Power for the console device is sent via CONN7. Pins 2 and 3 of CONN7 are the serial communications lines used for transmitting and receiving data.

Motor Control Drivers and Logic—Transistors Q7, Q8, Q9 and Q10 are Metal Oxide Semiconductor Field Effect Transistor (MOSFET) devices used to directly drive the motor in linear actuator 10. The four transistors are configured so that the linear actuator (connected to CONN8) may be driven either forward or backward by changing the polarity of the voltage appearing across the CONN8 terminals. To drive the linear actuator forward requires Q8 and Q9 to be switched into conduction. During this time Q7 and Q10 are switched to high impedance and so are effectively switched off thereby placing +12V on pin 1 of CONN8 and 0V on pin 2 of CONN8. To reverse the polarity of the voltage appearing across pins 1 and 2 of CONN8, and therefore reverse the direction of the linear actuator, requires Q8 and Q9 being switched to high impedance and Q7 and Q10 switched into conduction. This places 0V on pin 1 of CONN8 and +12V on pin 2 of CONN8. Zener diodes D6, D7, D8 and D9 are placed across the outputs of drive transistors Q7, Q8, Q9 and Q10 to protect them from reverse voltage induced across the linear actuator's motor when the transistors momentarily switch states. To quickly switch Q7, Q8, Q9 and Q10 (to reduce power consumption during switching), transistors Q3, Q4, Q5 and Q6 are used to amplify the signal from IC4. This allows for a higher current drive signal facilitating quicker switching of the drive transistors. R21 is placed between the drive transistors and ground (0V) to provide a current shunt for measuring current through the linear actuator. LED L5 is used for testing only.

External Sensor Adapter—25-way DB connector CONN 10 provides an interface to external sensors such as the auxiliary sensors 7 of FIG. 1. CONN10 may also be used to connect to the In-Circuit Serial Programming (ICSP) device for loading firmware onto IC4.

Current Sense Amplifier—Operational amplifier IC3:B is an operational amplifier configured to amplify and scale the signal from R21 so that IC4 is able to measure the current drawn by linear actuator 10. IC4 may be programmed to detect if linear actuator 10 is drawing current indicative of an error state, and in that case, warn the operator of an abnormal situation by means of buzzer 58, for example.

Linear Actuator Position Sensor—CONN3 is connected to the linear feedback potentiometer inside linear actuator 10.5 volts is placed across the potentiometer and the resulting voltage on the center tap terminal of the potentiometer is monitored by analogue input pin 2 of IC4. Accordingly, IC4 is able to determine the position of shaft 14 by monitoring the voltage on pin 2 of CONN4.

In-Circuit Serial Programming (ICSP) Power Supply Isolation—Transistor Q11 acts as a blocking device to voltages appearing at Vcc, so as only micro-controller IC4 receives power from the ICSP device. C14 stabilizes the 5V supply from the ICSP device for stable operation while programming. During programming, no power is connected to the rest of the circuit—only IC4 is operational. Pins 7 and 19 provide a power supply of 5V to IC4 during programming. Pins 8, 20 and 21 of CONN10 are where the data is transmitted from the ICSP device to IC4.

External Watchdog Timer (WDT) Device—The circuitry between pin 6 of IC4 and CONN11 is configured to generate a failsafe output signal should IC4, or any external modules fail in an unsafe manner (e.g. while the marine craft is under full throttle). High current loads, as may be associated with solenoids and motors, may be switched by connection to CONN5. For example, it is possible to connect an additional linear actuator to a throttle, rather than a gear train, via a solenoid-controlled link. In which case the solenoid would be energized by connection to CONN11. Under normal operating conditions, the solenoid is energized, thereby allowing the throttle to remain connected to the linear actuator and therefore, under full control of IC4. Should IC4 detect a fault condition, IC4 depowers pin 1 of CONN5 thereby switching off the solenoid and in turn decoupling linear actuator 10 from the throttle so that the throttle returns to its idle state.

During standard operation Pin 6 of IC4 sends an oscillating signal to the input of the WDT circuit. The oscillation is at a predetermined rate that must remain constant for the WDT to remain in a controlled active state. In this state, any device connected to the output of the external WDT will be held ON. In the case of an electrical system failure, controller device failure, fuse trip, system crash, or any other circumstance occurring that affects the integrity of the controller device's operation, the external WDT will be de-asserted. Any device attached to the output switch controlled by the external WDT will be switched OFF. IC4 already has an internal WDT, which is used to recover from software glitches and can recover very quickly. The external WDT is a 'last resort' safety feature designed to avert major system failures.

Firmware Description—Console

Figure 6:
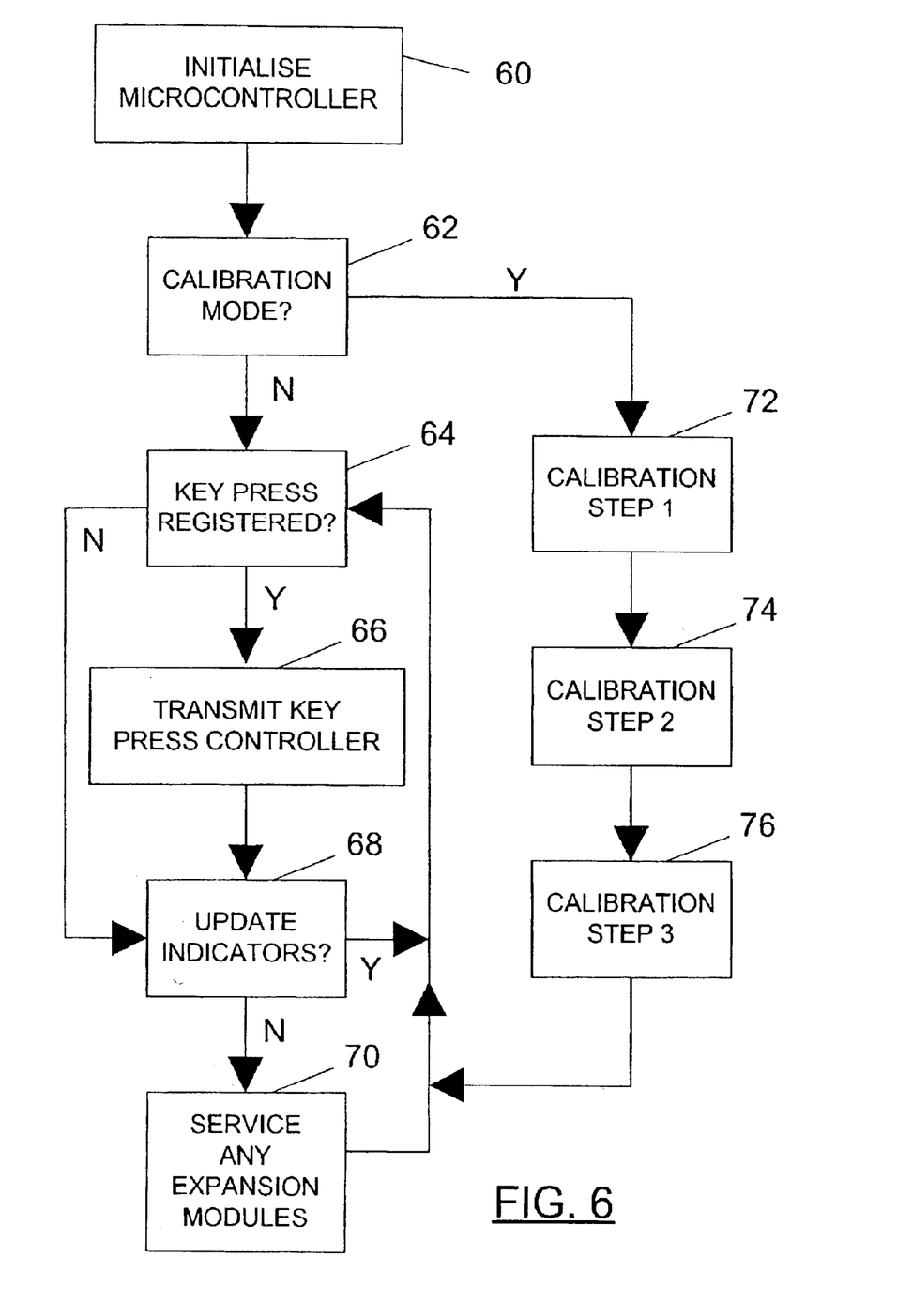
FIG. 6 is a flow chart of the firmware run by the console of the automated gear selection apparatus of FIG. 1.

The micro-controllers IC2 and IC4 in both console 34 and control unit 24 respectively contain on-board firmware that includes instructions for execution by the micro-controllers. FIG. 6 is a flowchart of the firmware in console 34. At box 60 controller chip IC2 in console 34 is initialized for operation. At box 62 the controller chip IC2 determines whether or not calibration mode has been entered. In the event that calibration mode has not been entered then control passes to box 64 wherein the controller chip IC2 monitors for a key press. If no key press is detected then control diverts to box 68, at which the state of indicators 56A–56C is updated. For example, if console 34 has received a signal from control unit 22 indicating that actuator shaft 14 has reached a reverse gear setpoint then LED 56C will be lit. Alternatively, if a key press is detected at box 64 then control passes to box 66 wherein a signal identifying the pressed key is transmitted to control unit 22. Indicators informing a console operator of the state of the linear actuator are updated at box 70. At box 70 the controller chip IC2 checks to determine if any additional plug-in modules have been connected. The additional modules may comprise auxiliary actuators 5 (FIG. 1.) for example. If additional modules have been connected then firmware routines to support the operation of the additional modules may be called.

Returning now to box 62, in order to enter calibration mode the console operator must take the AGSA through a predetermined sequence that is recognized by the console firmware as indicating that the calibration mode is to be entered. In the preferred embodiment the sequence is as follows. Firstly, the AGSA is disconnected from power, then while holding down the neutral key 38B the power is reconnected. In response the console firmware directs micro-controller chip IC2 to light all three LEDs 56A–56C. The console operator must then release neutral key 38B within three seconds of all of the LEDs being illuminated to correctly enter the calibration mode. After three seconds has elapsed all LEDs are then turned off and LED 56B is repeatedly flashed to indicate that the firmware has proceeded to box 72 of the flowchart of FIG. 6.

The AGSA firmware may include instructions for preventing gear changes above a certain engine RPM as a safety feature. It follows that the AGSA must be able to determine engine RPM. In order to do so the AGSA monitors the engine ignition system via CONN10 of the control unit. Depending on the number of cylinders, and whether the ignition system is a dual-fire type or not, a varying number of pulses per revolution will be generated by the ignition system. Accordingly, at box 72 the number of pulses that are generated per revolution must be entered into console 34 so that the AGSA can determine the engine RPM. (Where the AGSM is to be fitted to a diesel powered craft, which does not include an electronic ignition system, a magnet may be placed on the drive unit's axle and a suitable sensor located adjacent. The sensor is arranged to generate a signal for interpretation by the AGSM each time the axle rotates.) To vary the pulses-per-revolution parameter the forward and reverse keys 38A and 38C are operated to increment and decrement the parameter respectively. The number of revolutions that have been entered are confirmed by LED 56B flashing a corresponding number of times in quick succession. Once the correct value has been entered the neutral key 38B is depressed thereby passing the firmware to second calibration step 74 of FIG. 6.

At item 74 the maximum number of RPM at which a gear change may be made is entered, once again by means of the forward and reverse keys, in 100 RPM increments. Once again, LEDs on console 34 are flashed a number of times in quick succession to confirm the number, in hundreds, of RPM that have been entered.

At the third calibration step 76, the shaft positions or "setpoints" for each of the forward, reverse and neutral gear selection positions may be entered. Upon entering this state, the LED next to the reverse key flashes thereby indicating that the reverse gear position is ready to be positioned. The forward and reverse keys must then be operated to bring the actuator shaft to the position that is to correspond to the reverse key. The actuator will be extended or retracted as the forward and reverse keys are depressed. Once the correct position for proper engagement of the reverse gear is arrived at, the neutral key should be depressed. The AGSA then stores the linear actuator setpoint and will return back to this setpoint every time the reverse button is subsequently depressed in standard use.

LED 56B, i.e. the LED adjacent neutral key 38B will flash to indicate that the neutral actuator shaft position is being set. A similar procedure is used to set the shaft position that is to correspond to forward and neutral gear selections. After all three of the shaft positions have been set the calibration steps are completed and control diverts back to box 64.

Firmware Description—Control Unit

Figure 7:
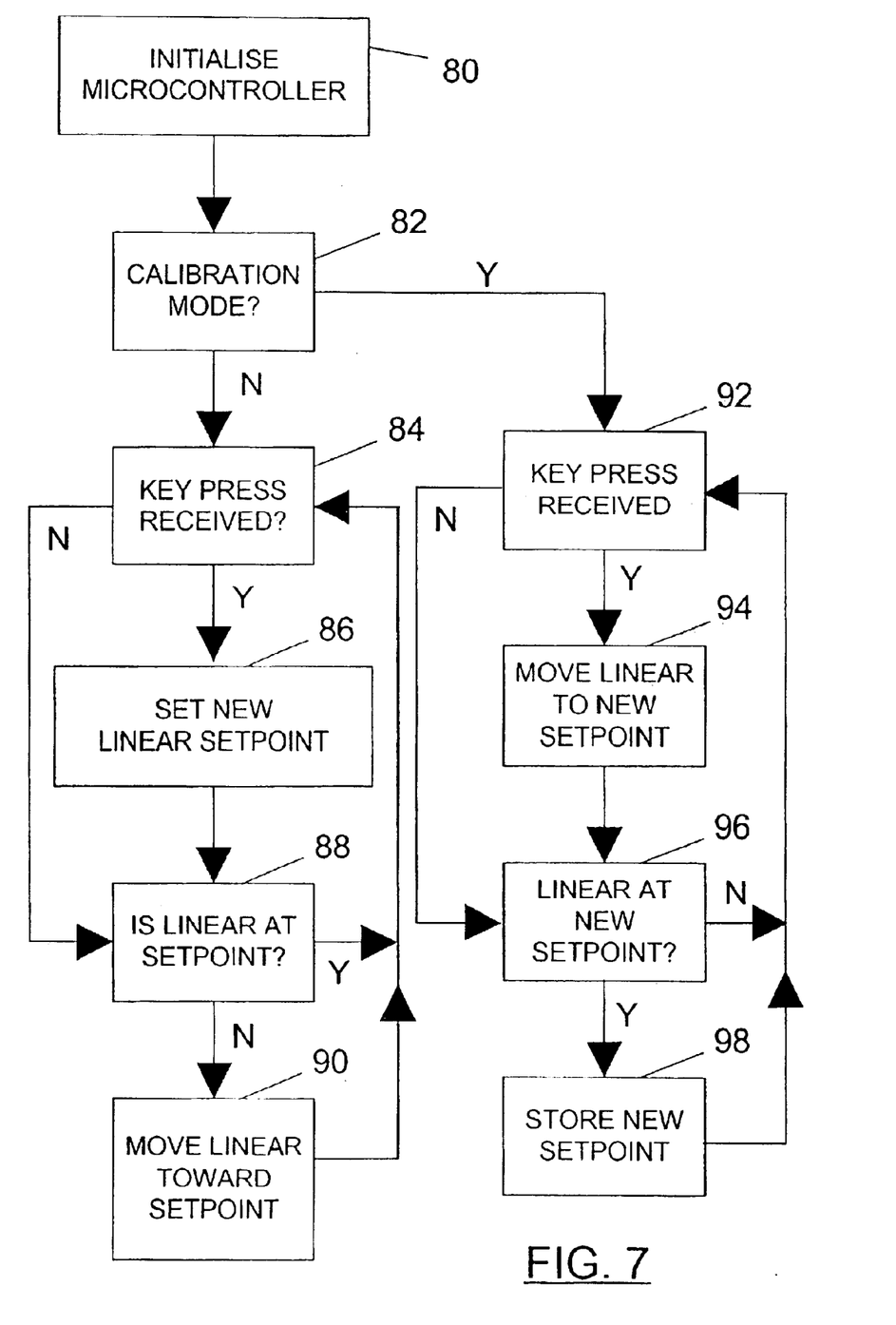
FIG. 7 is a flow chart of the firmware run by the control unit of the automated gear selection apparatus of FIG. 1.

Referring now to FIG. 7, there is depicted a flowchart of the inboard firmware of control unit 22. At startup the micro-controller in control unit 22 is initialized at box 80. Then, at box 82 the controller determines whether or not calibration mode has been entered. In the event that calibration mode has not been entered then control passes to box 84 where the controller determines whether or not a keypress has been received from console 34. In the event that a keypress has been received then control diverts to box 86 and a setpoint corresponding to the button that has been depressed is set. At box 88 the control unit determines whether or not the linear actuator shaft 18 is at the setpoint. If the linear actuator shaft is at the setpoint then control diverts back to box 84. Alternatively, if the linear actuator is not at the current setpoint then control diverts to box 90. At box 90 micro-controller IC4 sends appropriate biasing signals to MOSFETS Q3–Q6 which in turn bias Q7–Q10 so that motor driver currents are sent via CONN8 to drive the motor in linear actuator 10 and bring shaft 14 towards the current setpoint.

Box 90 includes instructions for the control unit to check how far away the linear actuator is from the setpoint. If the actuator shaft is far away from the setpoint then the controller moves the actuator rapidly towards the setpoint. As the actuator shaft gets closer to its desired position the controller moves it more slowly thereby decreasing the degree of overshoot.

In the presently described embodiment the position of actuator shaft 14 is updated one thousand times per second, thereby ensuring sharp and accurate control of the position of the shaft without recourse to computationally intensive proportional integro-differential (PID) controllers.

It will be realized that the automated gear selection apparatus of the present invention has been described in relation to a preferred embodiment. However, many other embodiments are possible. For example, rather than use a linear actuator a rotary actuator might instead be used to wind cable 37 precise distances about an actuator reel. Furthermore, it will be realized that a single, suitably programmed, micro-controller might be used rather than the two micro-controllers, one for the console and one for the control unit, of the preferred embodiment. Indeed the console and the control unit may be integrated into a single assembly if required. Other embodiments and variations of the invention will be apparent to those skilled in the art. Accordingly, the following claims are to be constructed broadly and not restricted merely to the preferred embodiment that is discussed herein.

What is claimed is:

1. An automated gear selection apparatus for a gearbox of a drive unit, the gearbox having a linear gear selector that is displaceable between at least a first position and a second position, the gear selection apparatus including:

an actuator including an elongate actuator member extendible and retractable relative to a housing of the actuator to be displaceable between at least two predetermined positions corresponding to the positions of the linear gear selector;

a micro-controller in communication with the actuator to control displacement of the actuator member, the actuator member being connectable to the gear selector for displacing said selector between at least the first and second positions, the micro-controller being configured to include firmware that defines instructions for monitoring control signals, instructions for bringing the actuator member towards setpoints corresponding to the control signals, instructions for monitoring a feedback signal indicating a position of the actuator member and instructions for user entry of setpoints comprising actuator states corresponding to particular gear selections; and a user interface means operatively connected to the microcontroller so that a user can selectively cause operation of the actuator and thus the gear selector, the user interface being configured to generate said control signals.

2. An apparatus according to claim 1, wherein a cable securing assembly is attached to the actuator member for engaging a gear selector cable.

3. An apparatus according to claim 1, wherein the elongate actuator member comprises a shaft.

4. An apparatus according to claim 3, further including a quick release member for attaching a gear selector cable to the shaft.

5. An apparatus according to claim 4, including a cable securing assembly attached to the shaft for engaging a gear selection cable, the cable securing assembly including a handle for manual gear selection.

6. An apparatus according to claim 3, wherein the micro-controller monitors a signal indicating engine revolution rate and wherein the firmware further includes instructions for determining whether or not to bring the shaft towards a setpoint on the basis of predetermined engine revolution rates.

7. An apparatus according to claim 6, further including instructions for user entry of the predetermined engine revolution rates.

8. An apparatus according to claim 6, wherein the signal indicating engine revolution rate comprises a signal from an engine ignition system of the engine.

9. An apparatus according to claim 3, wherein the instructions for bringing the shaft towards a setpoint include:

instructions for monitoring the position of the shaft;

instructions for comparing the position of the shaft to a current setpoint;

instructions for moving the shaft towards the setpoint at a speed that is dependent on the deviation of the position of the shaft from the setpoint in order to reduce overshoot.

10. An apparatus according to claim 1, wherein the user interface comprises a console including user data input and output means.

11. An automated gear selection apparatus for a gearbox of a drive unit, the gearbox having a linear gear selector displaceable between at least a first position and a second position, said gear selection apparatus including:

an actuator for displacing the linear gear selector between the at least a first position and a second position;

cable securing means releasably attached to the actuator for securing a gear selector cable between the actuator and the linear gear selector and including a handle for manual operation;

a micro-controller in communication with the actuator for controlling the actuator, the micro-controller being configured to include firmware that defines instructions for monitoring control signals, instructions for bringing the actuator member towards setpoints corresponding to the control signals, instructions for monitoring a feedback signal indicating a position of the actuator member and instructions for user entry of setpoints comprising actuator states corresponding to particular gear selections; and a user interface in communication with the microcontroller for receiving gear selections from a user.

12. An automated gear selection apparatus for a gearbox of a drive unit, the gearbox having a linear gear selector displaceable between at least a first position and a second position, said gear selection apparatus including:

a linear actuator including a movable shaft displaceable between at least two predetermined positions corresponding to at least the first position and the second position of the linear gear selector;

a controller electrically coupled to the actuator to control displacement of the shaft, the controller being configured to include firmware that defines instructions for monitoring control signals, instructions for bringing the actuator member towards setpoints corresponding to the control signals, instructions for monitoring a feedback signal indicating a position of the actuator member and instructions for user entry of setpoints comprising actuator states corresponding to particular gear selections;

a cable securing assembly attached to an end of the shaft by means of a quick release member, the cable securing assembly including a handle for applying force to a gear selector cable; and a user interface connected to the controller for user selection of a position of the linear gear selector.

13. An apparatus according to claim 12, wherein the controller comprises a micro-controller.

14. An automated gear selection apparatus for a gearbox of a drive unit, the gearbox having a gear selector that is displaceable between at least a first position and a second position, the gear selection apparatus comprising:

an actuator including an elongate actuator member extendible and retractable relative to a housing of the actuator that is displaceable between at least two predetermined positions corresponding to the positions of the gear selector;

a processor in communication with the actuator to control displacement of the actuator member, the actuator member being connectable to the gear selector for displacing said selector between at least the first and second positions, the processor configured to monitor control signals, to bring the actuator member towards setpoints corresponding to the control signals, to monitor a feedback signal indicating a position of the actuator member, and to permit entry of setpoints comprising actuator states corresponding to particular gear selections; and a user interface connected to the processor that generates said control signals in response to user input enabling selective gear selection by controlling actuator operation.

15. An apparatus according to claim 14, wherein a cable securing assembly is attached to the actuator member for engaging a gear selector cable.

16. An apparatus according to claim 14, wherein the actuator comprises an elongate actuator shaft.

17. An apparatus according to claim 16, further comprising a quick release member for attaching a gear selector cable to the shaft.

18. An apparatus according to claim 17, including a cable securing assembly attached to the shaft for engaging a gear selection cable, the cable securing assembly including a handle for manual gear selection.

19. An apparatus according to claim 16, wherein the processor monitors a signal indicating engine revolution rate and wherein the processor is further configured to determine whether or not to bring the shaft towards a setpoint on the basis of a predetermined engine revolution rate.

20. An apparatus according to claim 19, wherein the processor further configured to permit user entry of the predetermined engine revolution rate.

21. An apparatus according to claim 19, wherein the signal indicating engine revolution rate comprises a signal from an engine ignition system of the engine.

22. An apparatus according to claim 16, wherein the processor is further configured to:
   monitor the position of the shaft;
   compare the position of the shaft to a current setpoint;
   move the shaft towards the setpoint at a speed that is dependent on the deviation of the position of the shaft from the setpoint in order to reduce overshoot.

23. An apparatus according to claim 14, wherein the user interface comprises a console configured to permit user data input and provide output.

24. An automated gear selection apparatus for a gearbox of a drive unit, the gearbox having a linear gear selector that is displaceable between at least a first position and a second position, the gear selection apparatus comprising:
   an actuator that displaces the linear gear selector between the at least a first position and a second position;
   cable securing means releasably attached to the actuator for securing a gear selector cable between the actuator and the linear gear selector;
   a processor in communication with the actuator for controlling the actuator, the processor configured to monitor control signals, drive the actuator towards setpoints corresponding to the control signals, monitor a feedback signal indicating actuator position and permit user entry of setpoints comprising actuator states corresponding to particular gear selections; and
   a user interface in communication with the processor permitting gear selection by a user.

* * * * *